United States Patent Office.

IMPROVED BLACKING.

JOHN McCRELLISH, OF PHILADELPHIA, PENNSYLVANIA.

Letters Patent No. 59,851, dated November 20, 1866.

SPECIFICATION.

TO ALL WHOM IT MAY CONCERN:

Be it known that I, JOHN McCRELLISH, of the city and county of Philadelphia, and State of Pennsylvania, have invented a new and improved Coloring or Blacking for Harness, &c., and I do hereby declare that the following is a full, clear, and exact description of the same:

My invention relates to a preparation for blacking or coloring wagon and carriage tops and flies, harness, &c., and restoring the color to the same when faded or rubbed off.

I boil one half pound of black-oak bark, one half pound of white-oak bark, one half pound of chestnut-oak bark, one half pound of Spanish-oak bark, one half pound of logwood, and one half pound of japonica together in four quarts of rain or distilled water; to this, while boiling, I add one half pound of copperas, and afterwards strain the liquid through a fine cloth. I now boil two quarts of neats-foot oil with two gills of japan, to which, after being thoroughly united, I add two quarts of the aforementioned liquor of black-oak, white-oak, chestnut-oak, and Spanish-oak bark, logwood, and japonica, which, after boiling some time, is removed from the fire and has one half pint of alcohol added, and stirred until cool, when it is bottled and ready for use.

My improved coloring has the properties of softening and oiling carriage and harness leather, and, at the same time, keeping its color and generally preserving it.

What I claim as my invention, and desire to secure by Letters Patent, is—

A blacking or coloring composed of the ingredients herein specified and described.

In testimony whereof I hereunto sign my name to this specification in presence of two subscribing witnesses.

JOHN McCRELLISH.

Witnesses:
FRANK GARDE,
W. W. DOUGHERTY.